US006588655B2

(12) United States Patent
Stapleton, Jr.

(10) Patent No.: US 6,588,655 B2
(45) Date of Patent: Jul. 8, 2003

(54) NON-CONTACT FOOD PASS

(75) Inventor: James Alford Stapleton, Jr., Cornelia, GA (US)

(73) Assignee: Habersham Metal Products Company, Cornelia, GA (US)

( * ) Notice: Subject to any disclaimer, the term of this patent is extended or adjusted under 35 U.S.C. 154(b) by 0 days.

(21) Appl. No.: 10/042,559

(22) Filed: Nov. 20, 2001

(65) Prior Publication Data

US 2003/0094485 A1 May 22, 2003

(51) Int. Cl.$^7$ ................................................ B65G 11/04
(52) U.S. Cl. .......................... 232/44; 109/68; 232/43.1
(58) Field of Search ............................. 232/19, 22, 44, 232/1 E, 43.1, 43.4; 109/19, 67, 68; 220/476, 480; 49/68; 70/85

(56) References Cited

U.S. PATENT DOCUMENTS

| | | | |
|---|---|---|---|
| 1,784,743 A | | 12/1930 | Montgomery |
| 2,027,491 A | | 1/1936 | Percy |
| 4,120,124 A | | 10/1978 | Temple et al. |
| 4,149,474 A | | 4/1979 | Ruane |
| 4,351,247 A | | 9/1982 | Clark |
| 4,517,901 A | | 5/1985 | Clark |
| 4,571,901 A | | 2/1986 | Morris et al. |
| 4,763,444 A | | 8/1988 | Ritchie |
| 4,800,822 A | | 1/1989 | Adkins |
| 4,888,915 A | | 12/1989 | Goldenberg |
| D312,014 S | | 11/1990 | Friedman |
| 5,205,224 A | | 4/1993 | Durst |
| 6,182,402 B1 | | 2/2001 | Aalst |
| 6,302,325 B1 | * | 10/2001 | Alexander ................. 232/43.1 |
| 6,378,769 B1 | * | 4/2002 | Wolgamot ................... 232/44 |

* cited by examiner

*Primary Examiner*—William Miller
(74) *Attorney, Agent, or Firm*—Hinkle & O'Bradovich, LLC

(57) ABSTRACT

A non-contact food/cuff pass apparatus and system is disclosed. The apparatus generally includes a hollow body adapted to be affixed to a prison door aperture. The hollow body includes a door on one end. The other end is open to be affixed to the prison door aperture. A locking lever is connected to the main body. The locking lever is adapted to lock the body to the prison door. The interior of the body is used to place items to be passed to and from a prisoner.

17 Claims, 3 Drawing Sheets

NON-CONTACT FOOD PASS

BACKGROUND OF THE INVENTION

I. Field of the Invention

The present invention relates generally to the field of prison-related equipment and more particularly to an apparatus for passing food and other items without contact.

II. Description of the Related Art

In prison systems, guards and other staff often have to pass items such as food to prisoners in their prison cells. In addition, prisoners must often be hand cuffed before they are removed from their cells. Therefore, prison cell doors, frames and walls are equipped with small openings that are large enough to pass items. The openings are also large enough to have a prisoner put his hands through to be cuffed. The openings are equipped with doors that can be opened and closed to perform the described activities. Typically, the doors slide from side to side or up and down.

Sometimes, particularly troublesome prisoners abuse the openings by attacking the person passing the items through the opening. Furthermore, these prisoners often throw items through the opening such as used food and food utensils as well as bodily fluids. This abuse can pose danger to people outside the cell.

SUMMARY OF THE INVENTION

In accordance with the present invention and the contemplated problems which have and continue to exist in this field, the invention features an apparatus adapted to be attached to a prison door opening to avoid contact with a prison occupant while passing food and other items.

In general, in one aspect, the invention features an item-passing apparatus, including a hollow main body having a first open end and a second open end, a door connected to the first open end and an engagement system connected to the main body.

In one implementation, the door is rotatably connected to the main body with a hinge.

In another implementation, the apparatus further includes a door lock having a first piece connected to the main body and a second piece connected to the door, the two pieces adapted to interlock.

In another implementation, the engagement system includes a locking lever, upper body lips connected to the main body at the upper corners of the second opening, lower lip adapted to be positioned in opposition to the upper lips and a gearing mechanism connected to part of the locking lever, to the main body and to the lever lip.

In another implementation, the engagement system further comprises a first locking piece connected to the locking lever and a second locking piece connected to the main body, wherein the first and second pieces are adapted to align when apparatus is in a locked and engaged state.

In still another implementation, the locking lever includes an upper bar, a lower bar substantially parallel to the upper bar and arms connected to the upper and lower bars, the arms being positioned at an angle with respect to the main body, when the apparatus is in a locked state.

In yet another implementation, the gearing system includes a bracket connected to the main body, the bracket being rotatably connected an end of a long arm at the base of the bracket, the other end of the long arm being rotatably connected to the lower bar and a short arm rotatably connected to a point substantially midway of the long arm, the other end of the short arm being rotatably connected to a lever lip, one end of the lever lip arm being connected to the lower lip, the other end of the lever lip arm being rotatably connected to the bracket.

In another implementation, the upper bar, lower bar and the arms surround the main body.

In another implementation, the apparatus includes a window positioned in the main body.

In another implementation, the apparatus includes handles connected to the main body.

In another implementation, the main body is rectangular.

In another implementation, the apparatus is adapted to affix to several different prison doors.

In another aspect, the invention features a non-contact system, including a prison door having an access door and aperture and upper and lower lips, a non-contact pass, including a hollow and rectangular body having a first open end and a second open end and an engagement system connected to the main body, wherein the engagement system includes a locking lever having an upper bar, a lower bar and arms connecting the upper and lower bars, the locking lever surrounding the body, upper body lips connected to the main body at the upper corners of the second opening, a lower lip adapted to be positioned in opposition to the upper lips and a gearing mechanism connected to part of the locking lever, to the main body and to the lever lip.

In one implementation, the system includes a door hingably connected to the body adapted to close the first open end.

In another implementation, the door gives access to the body while the access door of the prison door is closed.

In another implementation, the access door of the prison door gives access to the body while the door is closed.

In another implementation, the system has a locked state wherein the upper body lips are engaged with the upper lips of the prison door and the lever lip is engaged with the lower lips of the prison door, the upper body lips and lever lip being positioned in opposition.

In another implementation, the system has an unlocked state.

In another implementation, the non-contact pass is adapted to be removed from the prison door while in the unlocked state.

In another aspect, the invention features a non-contact pass apparatus, including a hollow and rectangular body adapted to be placed over an aperture and means to lock the body to the aperture for the passing of items.

One advantage of the invention is that it provides a self-contained and mobile non-contact apparatus.

Another advantage is that the invention provides security from contact with a troublesome prisoner.

Other objects, advantages and capabilities of the invention will become apparent from the following description taken in conjunction with the accompanying drawings showing the preferred embodiment of the invention.

DETAILED DESCRIPTION OF THE INVENTION

Figure 1:
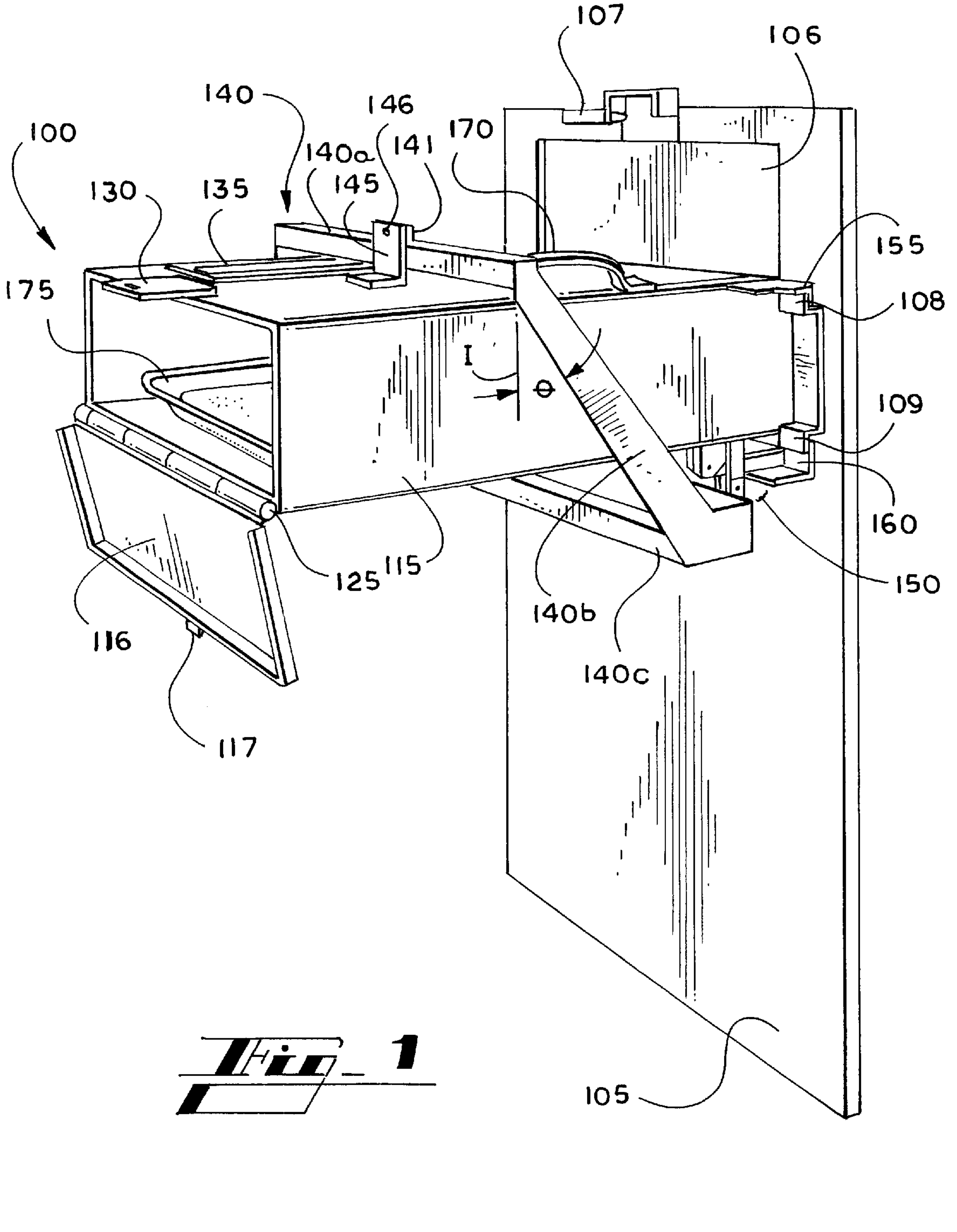
FIG. 1 illustrates a perspective view of an embodiment of a non-contact food/cuff pass connected to a prison door.

Referring to the drawings wherein like reference numerals designate corresponding parts throughout the several figures, reference is made first to FIG. 1 which illustrates a perspective view of an embodiment of a non-contact food/cuff pass ("pass") 100 connected to a prison door 105. The pass 100 is shown in a locked state. Reference to the locked state and unlocked state are made throughout the following description. The locked state is when the pass 100 is secured to a prison door 105. The unlocked state is when the pass 100 is detached and unsecured from the prison door 105.

A prison door such as door 105 typically includes a sliding door 106 that is adapted to be opened and closed to reveal an aperture (not shown) for passing items such as food as well as to cuff prisoners. The door shown is a guillotine type which opens upward and closes downward. It is understood that the embodiments described above and below can be used for any type of aperture door (for example horizontal single and double slide doors and others). The door 106 can be locked into place with the aid of a door lock 107 so that the door does not slam shut due to gravity. Two sets of lips 108, 109 typically are located adjacent to the aperture and above and below the aperture respectively.

The pass 100 includes a main body 115 that is typically in the form of a substantially hollow metal rectangular box. A food try 175 is shown within the main body 115. A door 116 is connected to the body 115 by a hinge 125. The door 116 typically include one piece of a lock 117 (described further below). Another piece of the lock 130 is connected to the body 115 so that the pieces 117, 130 line up, enabling a user to lock the door 116 in a closed position. The pass 100 further includes a window 135 located on the top portion of the main body 115, which is typically used as an item viewer as items are within the main body 115. Two body lips 155 (the other not shown are connected to the upper sides of the main body 115. The body lips 155 are adapted to engage the door lips 108.

The pass 100 further includes a locking lever 140, surrounding the main body 115 and connected to the lower portion of the main body 115. The locking lever 140 typically includes an upper bar 140*a*, adapted to come into contact with the upper portion of the main body 115 when the lever 140 is in the locked position (discussed below). Two side arms 140*b* (the other not shown) run along the side of the main body 115 at an angle θ with respect to a perpendicular line I with respect to the main body 115. The arms 140*b* (the other not shown) are connected to a lower bar 140*c* that is substantially parallel to the upper bar 140*a*. The locking lever 140 is shown in an engaged and downward state, in which the upper bar 140*a* is in contact with the main body 115.

A gearing mechanism 150 (described further below) is connected to the lower bar 140*c* and to the lower portion of the main body 115. The gearing mechanism 150 is connected to a lever lip 160 that is adapted to engage the set of lips 109 (the other is not shown) when the pass is in a locked state.

The pass 100 further includes one piece of a lock 145 that is adapted to align with another piece of the lock 141 connected to the upper bar 140*a* of the lever arm 140. When aligned, in the locked and engaged state, the two pieces of the lock 141, 145 can be connected together by a locking device such as a padlock to lock the lever arm 140 to the main body 115. Handles 170 (the other is not shown) are connected to the main body 115. The handles 170 are typically useful for a user to carry the pass 100 from location to location as well as for ease of placement on a prison door 105 over the aperture.

As described above, the pass 100 is shown in the locked state. In the locked state, the body lips 155 have been engaged with the upper lips 108 of the prison door 105 and the locking lever 140 has been engaged, thereby engaging the lever lips 160 with the lower lips 109 of the prison door 105. A further description of the locked and unlocked states as well as the locking operation is discussed below.

The locking lever 140, the upper body lips 155, the lever lips 160, the lock pieces 141, 145 and the gearing mechanism 150 work in conjunction forming an engagement system.

Figure 2:
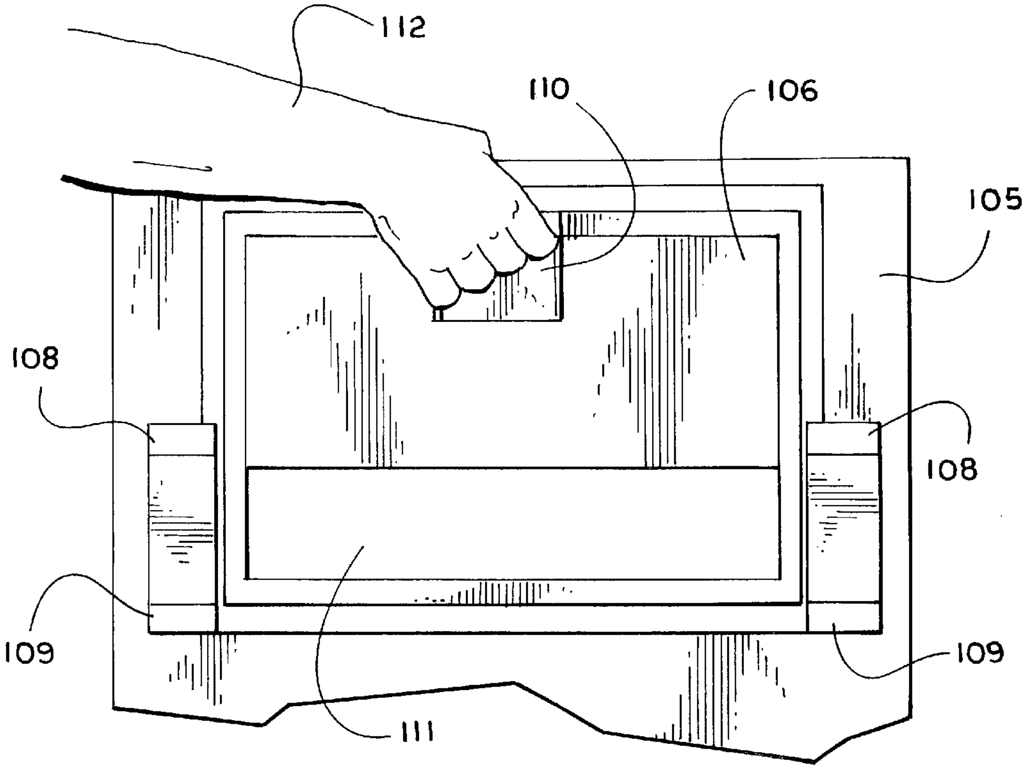
FIG. 2 illustrates a front view of a food/cuff opening on a prison door.

FIG. 2 illustrates a front view of an aperture 111 on a prison door 105. Both upper lips 108 and lower lips 109 are shown. A user 112 has engaged a door handle 110, thereby opening the access door 106 and exposing the aperture 111.

Figure 3:
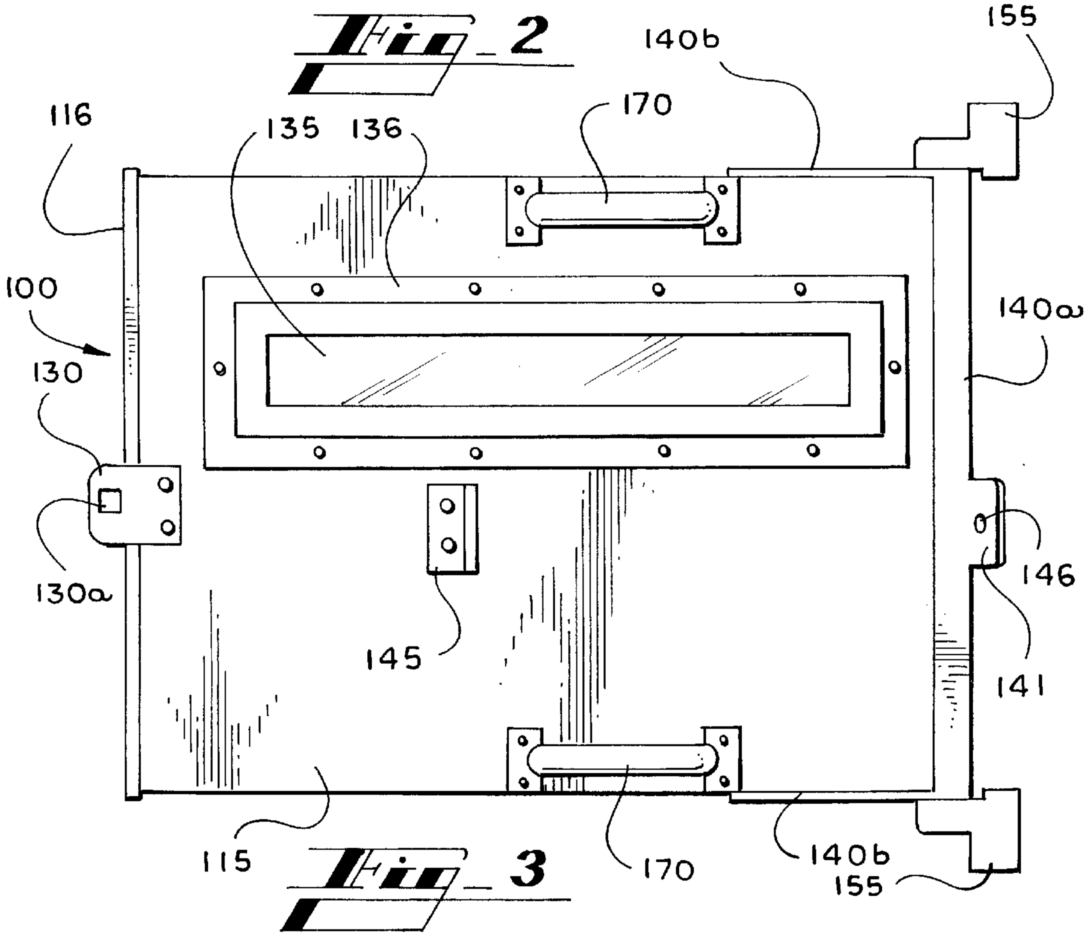
FIG. 3 illustrates a top view of an embodiment of a non-contact food/cuff pass in an unlocked state.

FIG. 3 illustrates a top view of an embodiment of a pass 100 in an unlocked state. The upper side of the main body 115 is shown having the window 135 surrounded by a border 136. Two handles 170 and the upper body lips 155 are also shown. The locking lever 140 is shown in the upward and disengaged position. As described above, the locking lever 140 includes an upper bar 140*a* and arms 140*b*. In this disengaged position, the upper bar 140*a* is out of contact with the main body 115, and the lock pieces 141, 145 are no longer aligned. The door 116 is connected to the body 115 by The hinge (not shown). One piece of the lock 130 is shown as well as the hole 130*a*.

Figure 4:
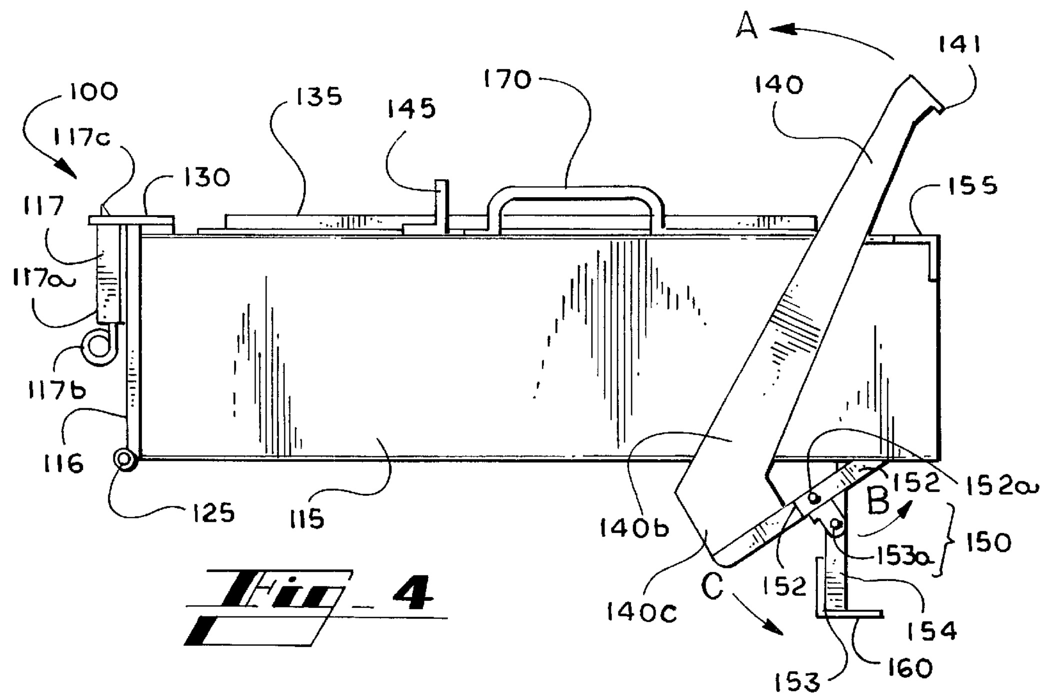
FIG. 4 illustrates a side view of an embodiment of a non-contact food/cuff pass in an unlocked state.

FIG. 4 illustrates a side view of an embodiment of a non-contact food/cuff pass 100 in an unlocked state. The door 116 is in a closed position. Both pieces of the lock 117, 130 are shown. The lock 117 typically includes a housing 117*a* that enclosed a spring-loaded bolt 117*c* connected to a handle 117*b*, which can be engaged by a user to connect the bolt 117*c* to the hole (130*a*) on the other piece of the lock 130. The door 116 is rotatably connected to the main housing 115 by the hinge 125. The handle 170 and the window 135 are also shown. The lock piece 145 is out of alignment with the other lock piece 141 connected to the upper boar of the locking lever 140. A side view of one of the arms 140*b* as well as a side view of the lower bar 140*c* are shown. The lever lip 160 is shown in a unlocked and disengaged state. The gearing mechanism 150 is also shown.

Figure 5:
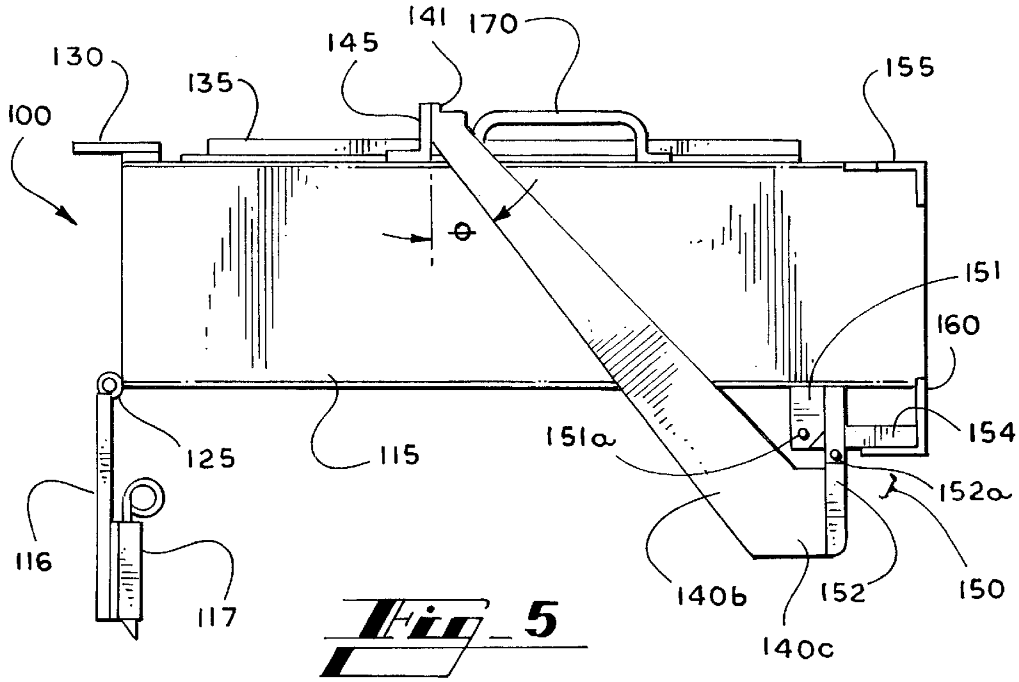
FIG. 5 illustrates a side view of an embodiment of a non-contact food/cuff pass in a locked state.

FIG. 5 illustrates a side view of an embodiment of a non-contact food/cuff pass 100 in a locked state. The door 116 is in an open position. Both pieces of the lock 117, 130 are shown disengaged, with the bolt 117*c* free from the hole in the lock piece 130. The lock piece 145 is shown in alignment with the other lock piece 141 connected to the upper boar of the locking lever 140. The lever 140 is in the engaged position showing one of the arms 140*b* oriented at an angle θ with respect with the main body 115. The lower bar is also shown 140*c*. The lever lip 160 is shown in a locked and engaged state. The gearing mechanism 150 is also shown.

Gearing Mechanism

Several references to the gearing mechanism 150 have been made. Referring to FIGS. 1 through 5, the gearing mechanism 150 is now described in greater detail. The gearing mechanism couples the locking lever 140 to the lever lip 160, enabling the lever lip 160 to engage the lower lips 109 of the prison door 105. The gearing mechanism typically includes a bracket 151, rotatably connected to one end of a long arm 152 at the base of the bracket (not shown). The other end of the long arm 152 is connected to the lower bar 140*c*. One end of a short arm 153 is connected at a point substantially midway of the long arm 152 by a pin 152*a*. The other end of the short arm 153 is rotatably connected to a lever lip arm 154 by a pin 153*a*. One end of the lever lip arm 154 is connected to the lower lip 160. The other end of the lever lip arm 154 is rotatably connected to the bracket 151 by a pin 151*a*.

From the disengaged state in FIG. 4 to the engaged state in FIG. 5, a user engages the locking lever 140, typically by the upper bar 140*a*, and applies a force in the direction of arrow A. There is rotation about the pins 151*a*, 152*a*, 153*a* as well as a pin (not shown) at the base of the bracket 151. During this engagement, the lever lip arm 154 moves generally in the direction B, the long arm 152 moves generally in the direction of the arrow C and the short arm 153 moves in a similar direction as arrows B and C until it is substantially concealed behind the long arm 152.

Food/Cuff Pass Apparatus Operation

The general operation of the pass 100 is now discussed with respect to FIGS. 1 through 5. When a user desires to pass items to prisoner behind the prison door 105, the access door 106 is kept closed concealing the aperture 111. The upper body lips 155 are placed on the upper lips 108 of the prison door 105 and the main body 115 is rested against the prison door 105. The user can typically manipulate the pass 100 with the use of the handles 170.

The user then engages the locking lever 140 as described with respect to the gearing mechanism 150 discussed above. The gearing mechanism 150 engages the lever lip 160 with the lower lips 109 on the prison door 105. The engagement of the upper body lips 155 with the upper lips 108 and the lever lips 160 with the lower lips 109 generally secures the pass 100 to the prison door 105. A locking device such as a padlock can optionally connect the lock pieces 141, 145 together for further security. The user can then disengage the lock pieces 117,130 and open the door 116 to place items within the main body 115.

Once the items are placed, the user can then close the door 116 and engage the lock pieces 117, 130. The user can then open the access door 106 and secure it with lock 107. Opening the access door 106 exposes the interior of the main body 115 to the aperture 111 thereby giving the prisoner access to the items within the body 115. Contact between the user and the prisoner is eliminated so long as the user keeps the door 116 closed and secured while the access door 106 is opened exposing the aperture 111. In another implementation, the pass 100 can include a further mechanism that prevents the door 116 from being opened while the access door 106 is open.

As the prisoner access the interior of the main body 115, the user can view this access through the window 135. Once the user is ensured that the items have been taken and the prisoner has cleared the interior of the main body 115, the user can then close disengage the lock 1078 and close the access door 106. If the prisoner has returned used items into the interior of the main body 115, the user can then disengage the lock pieces 117, 130 and open the door 117 to remove the items, once again without any contact with the prisoner so long as the access door 106 remains closed.

Once the user is done passing and receiving items, the user can remove the locking device (if any) from the lock pieces 141, 145, disengage the locking lever (as described above) which removes the lever lips 160 from the lower lips 109, and remove the upper body lips 155 from the upper lips 108, thereby removing the pass 100 from the prison door 105.

The embodiments and methods described above have been for a pass that allows items to be passed between a user and a prisoner without contact. It is understood that the pass can be implemented in any type of establishment that requires the passage of items without contact. Such establishments can be security and non-security. For example, the pass can be implemented in mental institutions and the like. The pass can also be implemented on any structure in addition to doors. For example, the pass can be used on apertures on walls and the like. In any implementation, the pass is typically manufactured of heavy metallic materials. For non-security implementations, the pass can be manufactured of lighter materials.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. An item-passing apparatus, comprising:

a hollow main body having a first open end and a second open end;

a door connected to the first open end; and an engagement system connected to the main body, wherein the engagement system comprises:

a locking lever;

a first locking piece connected to the locking lever and a second locking piece connected to the main body, wherein the first and second locking pieces are adapted to align when the item-passing apparatus is in a locked and engaged state;

upper body lips connected to the main body at the upper corners of the second open end;

a lever lip adapted to be positioned in opposition to the upper lips; and a gearing mechanism connected to part of the locking lever, to the main body and to the lever lip.

2. The apparatus as claimed in claim 1, wherein the door is rotatably connected to the main body with a hinge.

3. The apparatus as claimed in claim 2 further comprising a door lock having a first piece connected to the main body and a second piece connected to the door, the two pieces adapted to interlock.

4. The apparatus as claimed in claim 1, wherein the locking lever comprises:

an upper bar;

a lower bar substantially parallel to the upper bar; and arms connected to the upper and lower bars, the arms being positioned at an angle with respect to the main body, when the apparatus is in a locked state.

5. The apparatus as claimed in claim 4, wherein the gearing system comprises:

a bracket having a base and connected to the main body, the bracket being rotatably connected to an end of a long arm at the base of the bracket, the other end of the long arm being rotatably connected to the lower bar; and a short arm connected to a point substantially midway of the long arm, the other end of the short arm rotatably connected to a lever lip arm, one end of the lever lip arm being connected to the lever lip, the other end of the lever lip arm being rotatably connected to the bracket.

6. The apparatus as claimed in claim 4, wherein the-upper bar, lower bar and the arms surround the main body.

7. The apparatus as claimed in claim 1 further comprising a window positioned in the main body.

8. The apparatus as claimed in claim 1 further comprising handles connected to the main body.

9. The apparatus as claimed in claim 1, wherein the main body is rectangular.

10. The apparatus as claimed in claim 1 being adapted to affix to several different prison doors.

11. A non-contact system, comprising:

a prison door having an access door and aperture and upper and lower lips;

a non-contact pass, comprising:

a hollow and rectangular body having a first open end and a second open end;

a door connected to the first open end; and an engagement system connected to the main body, wherein the engagement system includes:

a locking lever having an upper bar, a lower bar and arms connected the upper and lower bars, the locking lever surrounding the main body;

a first locking piece connected to the locking lever and a second locking piece connected to the main body, wherein the first and second locking pieces are adapted to align when the item-passing apparatus is in a locked and engaged state;

upper body lips connected to the main body at the upper corners of the second open end;

a lever lip adapted to be positioned in opposition to the upper lips;

and a gearing mechanism connected to part of the locking lever, to the main body and to the lever lip.

12. The system as claimed in claim 11 further comprising a door hingably connected to the body adapted to close the first open end.

13. The system as claimed in claim 12, wherein the door gives access to the body while the access door of the prison door is closed.

14. The system as claimed in claim 13, wherein the access door of the prison door gives access to the body while the door is closed.

15. The system as claimed in claim 11 having a locked state wherein the upper body lips are engaged with the upper lips of the prison door and the lever lip is engaged with the lower lips of the prison door, the upper body lips and lever lip being positioned in opposition.

16. The system as claimed in claim 11 having an unlocked state.

17. The system as claimed in claim 16, wherein the non-contact pass is adapted to be removed from the prison door while in the unlocked state.

* * * * *